US008065209B1

(12) United States Patent  (10) Patent No.: US 8,065,209 B1
LaGuardia et al.  (45) Date of Patent: Nov. 22, 2011

(54) SYSTEM AND METHOD FOR BUNDLING FINANCIAL SERVICES PRODUCTS WITH A MORTGAGE IN CONNECTION WITH A MOVE EVENT

(75) Inventors: Marcus LaGuardia, San Antonio, TX (US); Cheryl Anne Howell, San Antonio, TX (US); Patricia Jeanette Dix, San Antonio, TX (US); Charles Berton Starks, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 11/938,555

(22) Filed: Nov. 12, 2007

(51) Int. Cl.
  *G06Q 40/00* (2006.01)
(52) U.S. Cl. ............................................ 705/35; 705/38
(58) Field of Classification Search .................... 705/35, 705/38
  See application file for complete search history.

(56) References Cited

U.S. PATENT DOCUMENTS

| | | | |
|---|---|---|---|
| 5,673,402 A * | 9/1997 | Ryan et al. ...................... 705/38 |
| 5,819,230 A * | 10/1998 | Christie et al. .................... 705/4 |
| 6,076,072 A * | 6/2000 | Libman ......................... 705/36 R |
| 6,648,189 B1* | 11/2003 | Minton et al. ................... 223/24 |
| 6,684,189 B1 | 1/2004 | Ryan et al. |
| 6,985,886 B1 | 1/2006 | Broadbent et al. |
| 7,340,435 B2 | 3/2008 | McDonald et al. |
| 7,472,088 B2 | 12/2008 | Taylor et al. |
| 2001/0029482 A1 | 10/2001 | Tealdi et al. |
| 2001/0044743 A1 | 11/2001 | McKinley et al. |
| 2002/0013774 A1 | 1/2002 | Morimoto |
| 2004/0117217 A1 | 6/2004 | Reber et al. |
| 2004/0128170 A1* | 7/2004 | MacKethan et al. .............. 705/4 |
| 2005/0108064 A1 | 5/2005 | Castleman et al. |
| 2005/0203830 A1* | 9/2005 | Prieston .......................... 705/38 |
| 2007/0226014 A1 | 9/2007 | Alemayehu et al. |

OTHER PUBLICATIONS

Grace, Martin F., Klein, Robert W. and Kleindorfer, Paul R.; "The Demand for Homeowners Insurance with Bundled Catastrophe Coverage"; Journal of Risk and Insurance; Sep. 2004; pp. 351-379; vol. 71, No. 3.

Chaudhary, Sunil, Green, Michelle, Mahmoudi, Ramin, Ting, Vicki. "The Impact of New Information Technology on the US Mortagage Industry," The UCLA Business and Information Technologies (BIT) Global Project; 2007; World Scientific Press.

Gribble, Jules, and McGing, Sean; "Insurance: Online or On the line?" Australian Actuarial Journal 6; Jun. 2000; pp. 347-422; Copyright 2000 The Institute of Actuaries of Australia.

(Continued)

*Primary Examiner* — Lindsay M. Maguire
(74) *Attorney, Agent, or Firm* — Kilpatrick Townsend & Stockton LLP

(57) ABSTRACT

Financial products, such as a mortgage, homeowner's insurance, and various forms of life insurance, can be packaged together and marketed around a move event. A customer can apply for a mortgage on a web site. As part of the application process, certain data is collected from the customer, and other data may be retrieved from one or more databases. This information can be used to offer and price homeowner's insurance and life insurance, and to suggest an amount of insurance. The web site may offer the customer the chance to buy a mortgage and insurance as a package, after answering a small number of questions that are used to assess the insurance-related risk. The customer may also be offered the chance to make a unified monthly payment for the package of both mortgage and insurance products.

24 Claims, 8 Drawing Sheets

OTHER PUBLICATIONS

Markus, M. Lynne, Steinfield, Charles W. and Wigand, Rolf T.; "The evolution of vertical IS standards: Electronic interchange standards in the U.S. home mortgage industry"; paper presented at the Standards Making: A Critical Research Frontier for Information Systems Workshop; Dec. 12-14, 2003; pp. 80-91; Seattle, WA.

Hamilton, John and Gunesh, Reshmee; "Incorporating Customer Interface Marketing Design Elements to Leverage Strategic Positioning in the On-line Real Estate Industry"; 3rd International Conference on Business; 2003; vol. 3, Issue 1; pp. 1-9; University of Hawaii, Honolulu, HI.

\* cited by examiner

Welcome to the Mortgage Application Assistant

To obtain a mortgage quote, please enter the following information:

Name: ⬜ — 302

Address: ⬜ — 304

306 — City: ⬜   State: ⬜ — 308   Zip: ⬜ — 310

Amount of mortgage: ⬜ — 312

Property Address: ⬜ — 314

Annual income: ⬜ — 316

1. Do you use tobacco products    502

○   Yes        ○   No
                                  504
2. Have you seen a doctor in the past 5 years for a serious illness?

○   Yes        ○   No

_FIG. 5_

SYSTEM AND METHOD FOR BUNDLING FINANCIAL SERVICES PRODUCTS WITH A MORTGAGE IN CONNECTION WITH A MOVE EVENT

CROSS-REFERENCE TO RELATED APPLICATIONS

This application is related by subject matter to the following commonly assigned applications, the entirety of which are hereby incorporated by reference herein: U.S. patent application Ser. No. 11/938,573, and U.S. patent application Ser. No. 11/938,584, each entitled "System and Method for Bundling Financial Services Products with a Mortgage in Connection With a Move Event".

BACKGROUND

Purchase of a home is an event that can involve various financial issues. Raising the money to buy the home through a mortgage loan is one issue, but other issues exist. For example, many people choose to obtain life insurance to cover the amount of money borrowed, in order to ensure that there are sufficient assets for the person's family to remain in the home in the event of the death of the family's primary income provider. As another example, purchase of a home is usually accompanied by purchase of homeowner's insurance.

The time when a person moves from one home to another (a "move event") provides an opportunity to consider various types of financial products in addition to the purchase money mortgage itself—e.g., various types of insurance may be considered. However, these types of financial products are typically offered and marketed separately, and are not structured around a move event.

SUMMARY

A move event provides an opportunity to consider various types of financial products, such as a mortgage, homeowner's insurance, and life insurance, together as one package.

A customer may visit a financial services company's web site to apply for a mortgage loan. As part of the process of applying for the mortgage, the customer may provide certain data, such as the customer's income, address, and the amount to be borrowed. Additionally, certain information may be collected about the customer, such as credit scores, insurance scores, and any existing financial history that the company may have concerning that customer. Since this information about the customer and the applied-for loan is available to the company's web server during the application process, this information can be used to offer additional products to the customer. For example, information about the location of the property can be used to determine a price of homeowner's insurance. Moreover, information about the amount of money being borrowed may assist in determining an amount of life insurance that the customer might wish to purchase, and the customer's known risk factors can be used to determine a cost of that insurance.

When the customer completes a mortgage application, he or she may be offered a package or bundle of financial services products, such as homeowner's insurance and/or some type of life insurance. Information collected from the mortgage application, and information such as credit scores and the company's recorded experience with the customer, may be used to determine what type of package to offer to the customer, and the price at which the package is to be offered. A web site that is configured to offer such a package in connection with a mortgage application may ask the customer a small number of additional question that relate to risk factors associated with the insurance to be offered. For example, in order to assist in the determination of what life insurance to offer, and at what price, the web site may ask the customer about tobacco usage and history of certain serious illnesses. Since many insurance applications involve a large number of questions, offering the customer the chance to obtain insurance by answering a small number of questions may increase the chance that the customer will take the mortgage and insurance as a package. The customer may also be offered the chance to pay for the mortgage and insurance in a unified monthly payment, which may further entice the customer to obtain the mortgage and insurance as a package.

This summary is provided to introduce a selection of concepts in a simplified form that are further described in the detailed description. This summary is not intended to identify key features or essential features of the claimed subject matter, nor is it intended to be used to limit the scope of the claimed subject matter.

BRIEF DESCRIPTION OF THE DRAWINGS

FIG. 3 is a block diagram of a user interface that may be used for a mortgage application.

FIG. 5 is a block diagram of a user interface that may be used to ask a customer certain questions relating to insurance risk assessment.

DETAILED DESCRIPTION

A move event, such as purchase of a home, is a significant financial event. For many people, it is the largest purchase they will make in their lives, and has more of a financial impact on their finances than other financial events. Raising financing for the house—usually in the form of a mortgage loan—is one way in which a home purchase affects a person's finances. However, the purchase of a home can affect a person or a family's finances in other way.

For example, buying a home can affect the amount of life insurance that one may wish to carry, either in the form of a traditional life insurance policy, or a mortgage protection policy tied to the balance of the mortgage. Many homebuyers choose to obtain sufficient life insurance to cover the amount of their mortgage, so that their families can remain in the purchased home in the event of an untimely death. Additionally, buying a home is normally accompanied by buying a homeowner's insurance policy to cover loss of the home and its contents. In many cases, a home purchase involves moving from a smaller home to a larger home, which may involve purchasing additional possessions (e.g., additional furniture), which results in additional property to insure.

Typically, a financial services company first comes in contact with a homebuyer, or learns of an existing customer's purchase of a new home, when the customer applies for a mortgage. This contact can be leveraged by offering the buyer insurance coverage at the time the mortgage is applied for. Leveraging the mortgage application contact in this way assists both the financial services provider and the customer. The financial services provider obtains what may be the first opportunity to obtain new or increased insurance business from the customer. Moreover, the process of providing a price and/or amount of insurance coverage may be simpler for the customer, since some of the information collected as part of the mortgage application process can be used to suggest insurance coverage amounts and/or options, or to assess risk, thereby freeing the buyer from having to enter the information again. Underwriting criteria for insurance may be relaxed or simplified when insurance coverage is sought in connection with a mortgage application, thereby simplifying the insurance application process for the customer. In one example, based on a mortgage application, a system can suggest an amount of life insurance and/or homeowners insurance coverage, and can offer a quote without going through a traditional underwriting process, and possibly a very small number of questions about the customer's health history.

Figure 1:
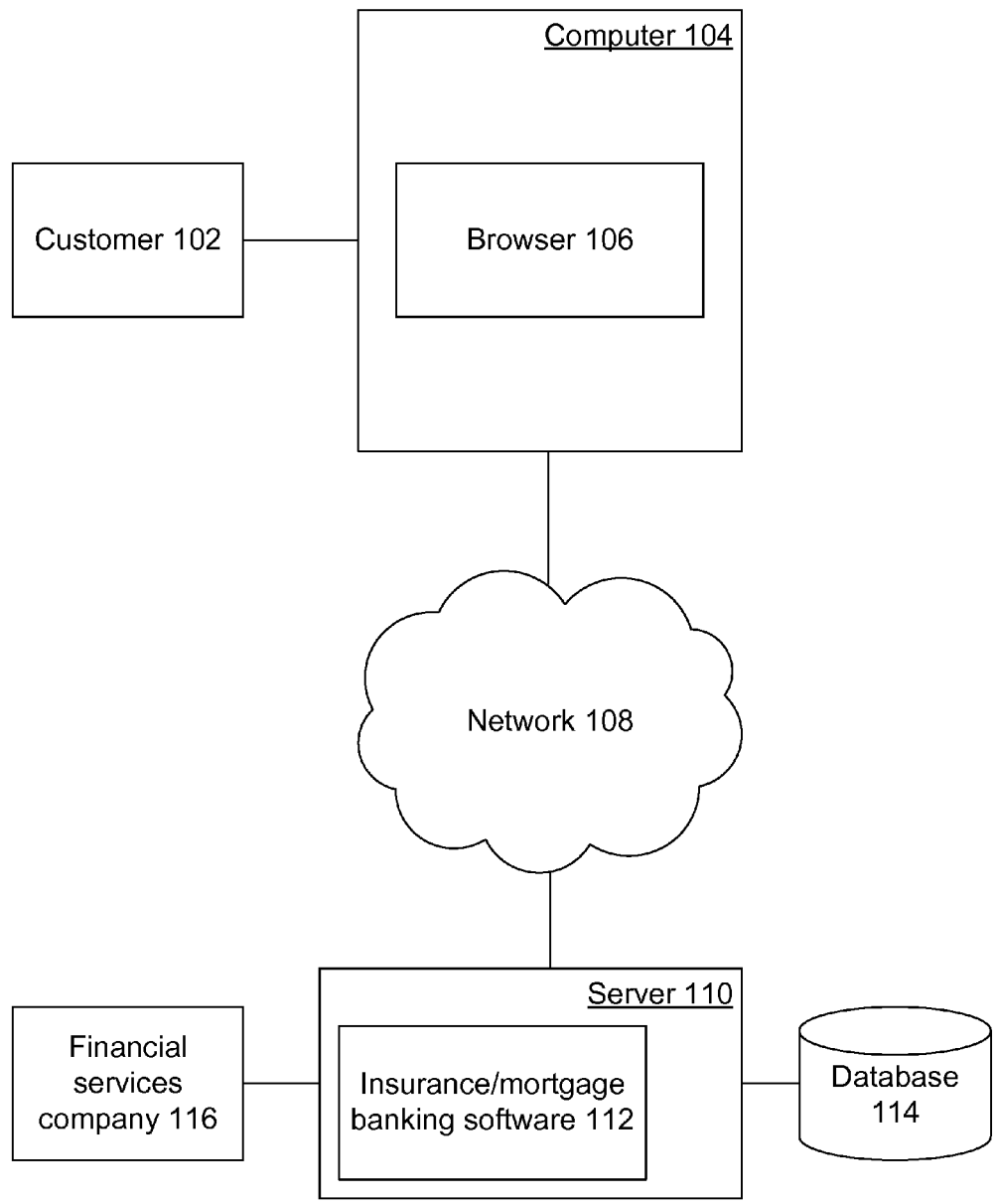
FIG. 1 is a block diagram of a computer and a web server that participate in a transaction concerning a mortgage and other financial products.

Turning now to the drawings, FIG. 1 shows a system that can be used to interact with a customer concerning mortgage and insurance. Customer 102 interacts with computer 104. Computer 104 may, for example, be a personal computer at customer 102's house or place of business, a computer at a public location, etc. Customer 102 may interact with computer 104 through a browser 106, which is implemented as software running on computer 104. For example, customer 104 may use browser 106 to visit the web site of a financial services company in order to apply for a mortgage.

Computer 104 is connected to network 108. Network 108 may, for example, be or comprise the Internet, but, alternatively, network 108 could be any network. Other computers (or other types of devices) may be connected to network 108. One example of such a network is server 110. In the example of FIG. 1, server 110 is a server operated by or on behalf of a financial services company 116. For example, server 110 may be a web server that stores and executes software to implement financial service company 116's web site, or a portion of such a web site. As one example of such software, server 110 may store and/or execute insurance/mortgage banking software 112. Software 112 may interact with the user to obtain applications for mortgages and/or insurance, and may provide pricing information and other information about such mortgages and/or insurance. For example, software 112 may collect customer 102's application for a mortgage, and may then inquiry about customer 102's interest in purchasing insurance and/or offer customer 102 the opportunity to obtain the mortgage and insurance as a package.

Software 112 may access and/or store information in database 114. For example, database 114 may contain information that financial services company 116 maintains concerning customer 102, such as basic customer data (e.g., name, address, date of birth, etc.), as well as information about customer 102's existing relationships with financial services company 116. Information about such existing relationships may include risk and/or credit information from other insurance and/or banking relationships that customer 102 maintains with financial services company 116.

Figure 2:
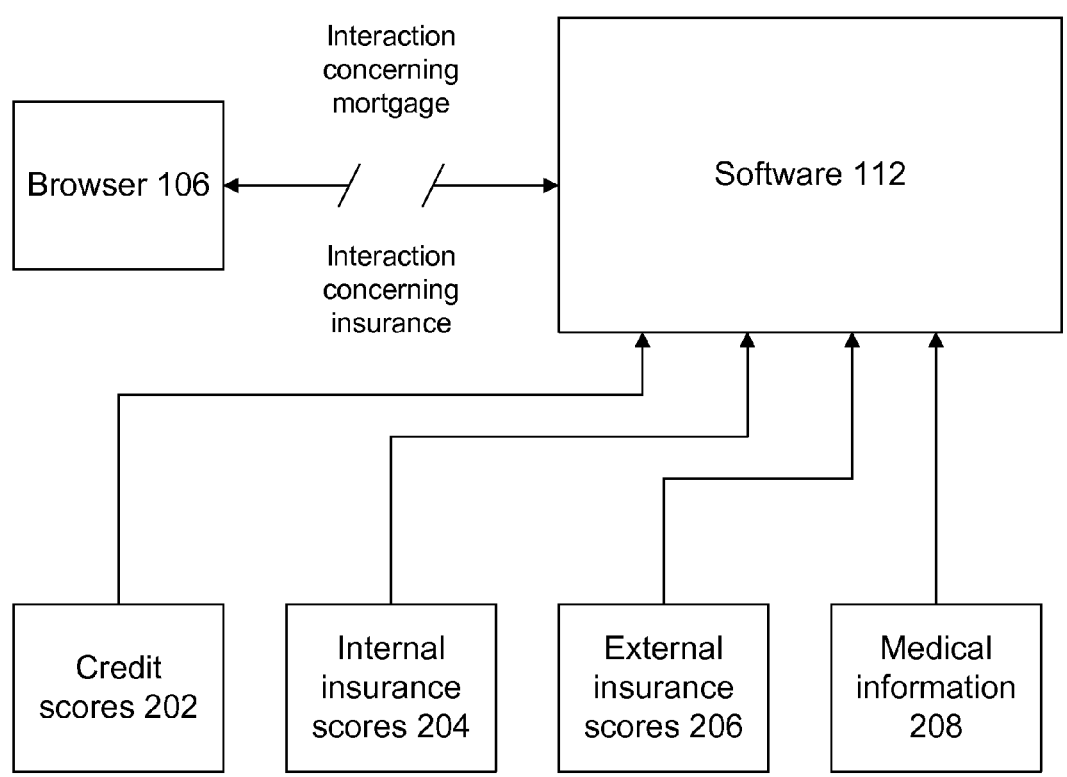
FIG. 2 is a block diagram of web server software that allows a customer to engage in a transaction concerning a mortgage and other financial products.

FIG. 2 shows software 112 accessing certain information. The accessed information may be used to make decisions about offering insurance to a customer. For example, software 112 may access credit scores 202, internal insurance scores 204, external insurance scores 206, medical information 208, and/or any other information. These pieces of information are examples of the type of information that may be stored in database 114 (shown in FIG. 1), although any type of information could be stored in that database.

Credit scores 202 may include commercial credit scores, such as a FICO scores, Vantage scores, etc. Internal insurance scores 204 may include internal ratings that a financial services company maintains about an existing customer, the company's experience with that customer, or any other information that the company is in possession of. External insurance scores 206 may include ratings relating to a customer's insurance risk that the financial services company obtains from a third-party rating agency. For example, credit reporting agencies may use statistical risk models to rate a potential customer's insurance risk based on the customer's past credit behavior. A score under such a mathematical model, if obtained from a third-party source such as a credit reporting agency, constitutes an example of an external insurance score 206. Medical information 208 includes medical information that a financial services company may have on file for a customer. Such information may, for example, be obtained in connection with an existing life, health, or other type of insurance policy that the customer maintains with the financial services company.

As previously noted in connection with FIG. 1, software 112 may interact with a consumer through browser 106, and the interaction may concern a mortgage and/or insurance. Software 112 may use information such as credit scores 202, internal insurance scores 204, external insurance scores 206, medical information 208, or other information, to determine whether to offer a customer insurance (e.g., life insurance, homeowner's insurance, etc.), and to assess the risk associated with such a policy in order to provide a price for the insurance. For example, a customer may use browser 106 to interact with software 112 to apply for a mortgage. Software 112 may then access the various types of information mentioned above to determine whether to offer the customer the opportunity to purchase insurance, and the price to be paid for that insurance. Additionally, software 112 may use information obtained in connection with the mortgage application (e.g., the amount to be borrowed under the mortgage) to determine the amount of insurance to suggest to the customer.

FIGS. 3-6 are examples of user interfaces that may be displayed to a customer in connection with a process of taking an application for a mortgage and offering insurance to the customer. These user interfaces may, for example, be displayed to a customer through a web browser, although the user interfaces can be displayed by any mechanism.

FIG. 3 shows an example user interface 300 that allows a user to apply for a mortgage. User interface 300 asks a customer to enter certain information in order to obtain a mortgage quote. For example, user interface 300 may request that the customer enter his or her name into box 302, address into box 304, city into box 306, state into box 308, and zip code into box 310. Additionally, user interface 300 may request that the customer enter the amount of the mortgage being sought into box 312, the address of the property to be mortgaged into box 314, and the customer's annual income into box 316. The information shown in FIG. 3 is an example, although any type of information could be solicited and/or collected from the customer.

Figure 4:
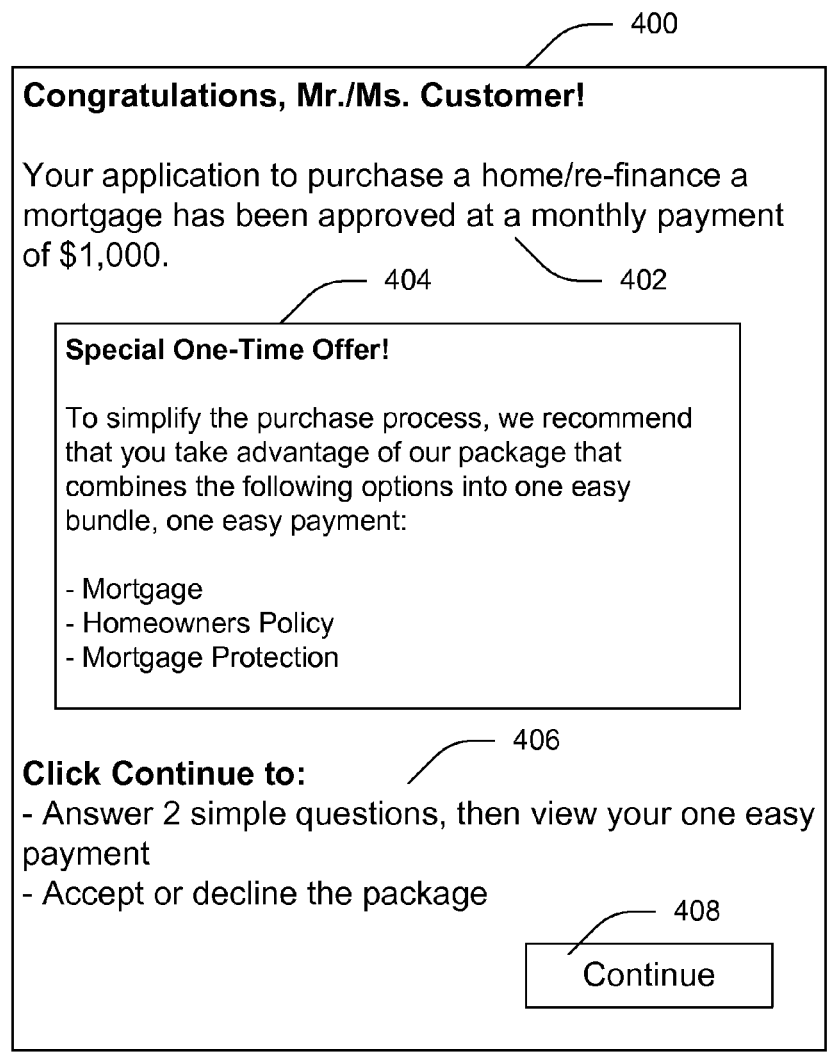
FIG. 4 is a block diagram of a user interface that may be used to offer a customer the opportunity to apply for a package of financial products.

After the customer provides the information requested in user interface 300, the customer may be taken to another user interface, such as a user interface that provides a quote for the mortgage that the customer applied for, and also makes certain other offers. FIG. 4 shows an example of such a user interface 400, which may be presented to the customer after the customer has applied for a mortgage.

Example user interface 400 informs the customer that the mortgage has been approved. User interface 400 also informs the customer of the monthly payment 402 on the mortgage. Additionally, user interface 400 may provide an offer 404 to customer to purchase other financial products, such as a homeowner's insurance policy and/or mortgage protection, as a package with the mortgage. User interface 400 may advise the customer that purchasing these different financial products as a package allows them to be paid for in one periodic payment (e.g., one payment per month to cover the group of products). In one example, user interface 400 may characterize the package using terms such as "special offer," thereby creating a sense of urgency which may increase the likelihood that the customer will buy or investigate the package. User interface 400 may also contain advice 406 that informs the customer what he or she would do to obtain the package. For example, advice 406 may indicate that the customer can obtain the package by answering two questions. As discussed subsequently, these two questions may be used as part of a risk assessment that is made in the process of providing mortgage protection and/or life insurance. User interface 400 may provide a button 408, which the customer can click to perform the next stage of the process of obtaining the package.

FIG. 5 shows a user interface 500, which may be displayed as part of a process of offering and/or providing a package of financial products to a customer. User interface 500 may comprise, for example, two questions 502 and 504. Inasmuch as the price of mortgage protection and life insurance (or the decision to offer these financial products at all) may be based to some extent on the health of the applicant, these questions may be designed to weed out certain applicants who are a poor risk and/or to charge applicants an additional premium when higher risk factors are present. In one example, question 502 asks if the customer uses tobacco products, and question 504 asks if the customer has seen a doctor in the past five years for a serious illness. The questions could add additional levels of specificity. For example, question 504 could list particular illnesses, such as heart disease, cancer, etc. Any number or type of questions could be asked. However, part of the appeal to a customer of obtaining a package of financial products as part of a mortgage application is that the customer can obtain these products by answering a small number of simple questions. Thus, if the financial services provider chooses to ask additional questions, or more complex questions, than those shown in FIG. 5, the cost of obtaining additional information from the customer may be that the package of financial products is less appealing, and the customer is less likely to purchase the package.

Figure 6:
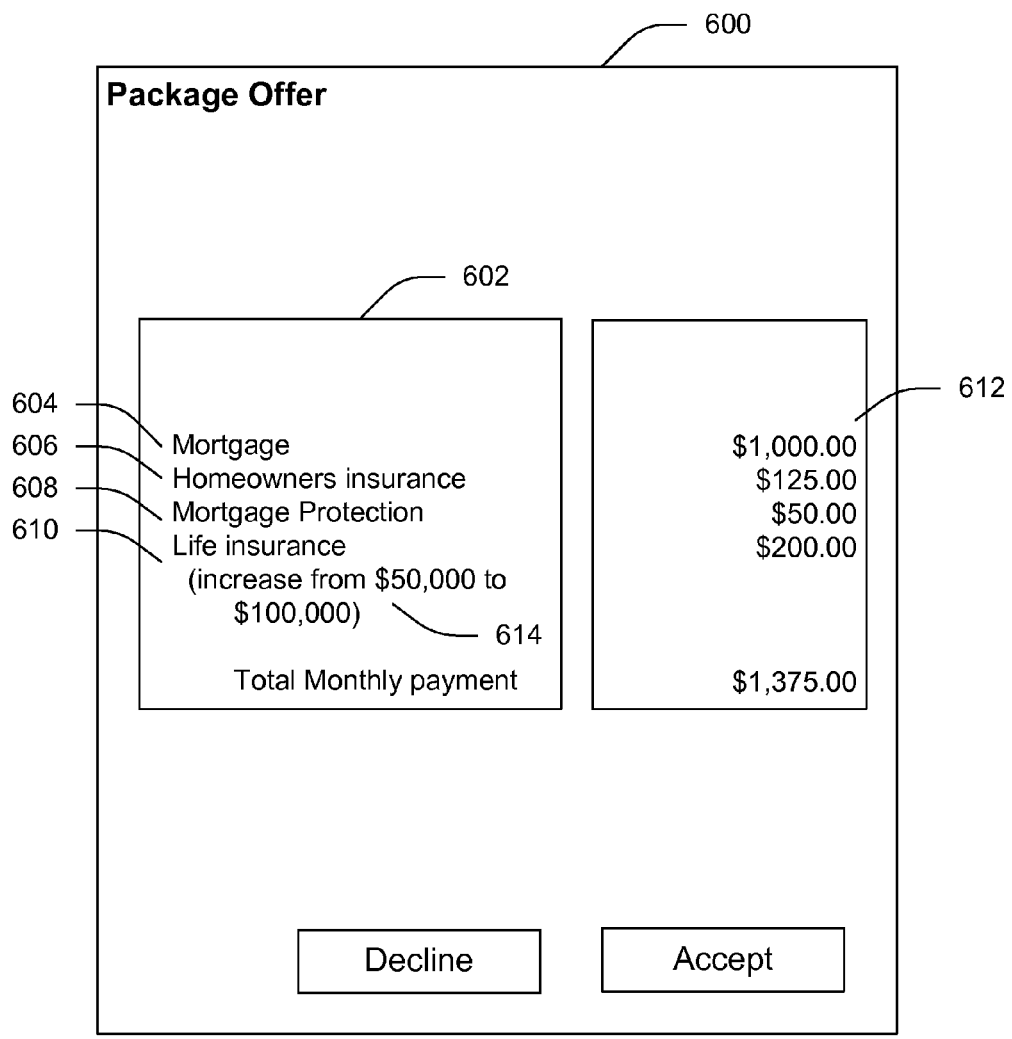
FIG. 6 is a block diagram of a user interface that may be used to provide a package of financial products, and a price for those products, to a customer.

After the customer answers the questions of FIG. 5, the customer may be shown a package of financial services that may be purchased, and the price for the package. FIG. 6 shows a user interface that displays the package to the customer. User interface 600 may show package 602, which contains various financial products, such as mortgage 604, homeowner's insurance 606, mortgage protection 608, and/or life insurance 610. Pricing box 612 may itemize the various financial products. Pricing box 612 may indicate the portion of the price attributable to each of the products, as well as the total price. User interface 600 may contain an indication of the amount that the customer is increasing his or her life insurance coverage. As will be recalled, one issue that arises in a move event is that the customer may be investing in a larger home, and therefore may wish to purchase additional life insurance. Since records of the customer's existing financial relationship can be obtained from a database as part of the mortgage application process, the customer's original amount of life insurance may be known at the time of the application, and the knowledge of this fact can be leveraged to show the customer how much his or she is increasing the amount of his or her life insurance. Providing this type of information to the customer may have the effect of helping the customer connect an increase in mortgage loan responsible with the reasons to increase life insurance. Helping the customer to make this connection may, in turn, increase the likelihood that the customer will choose to buy life insurance as part of a package.

Figure 7:
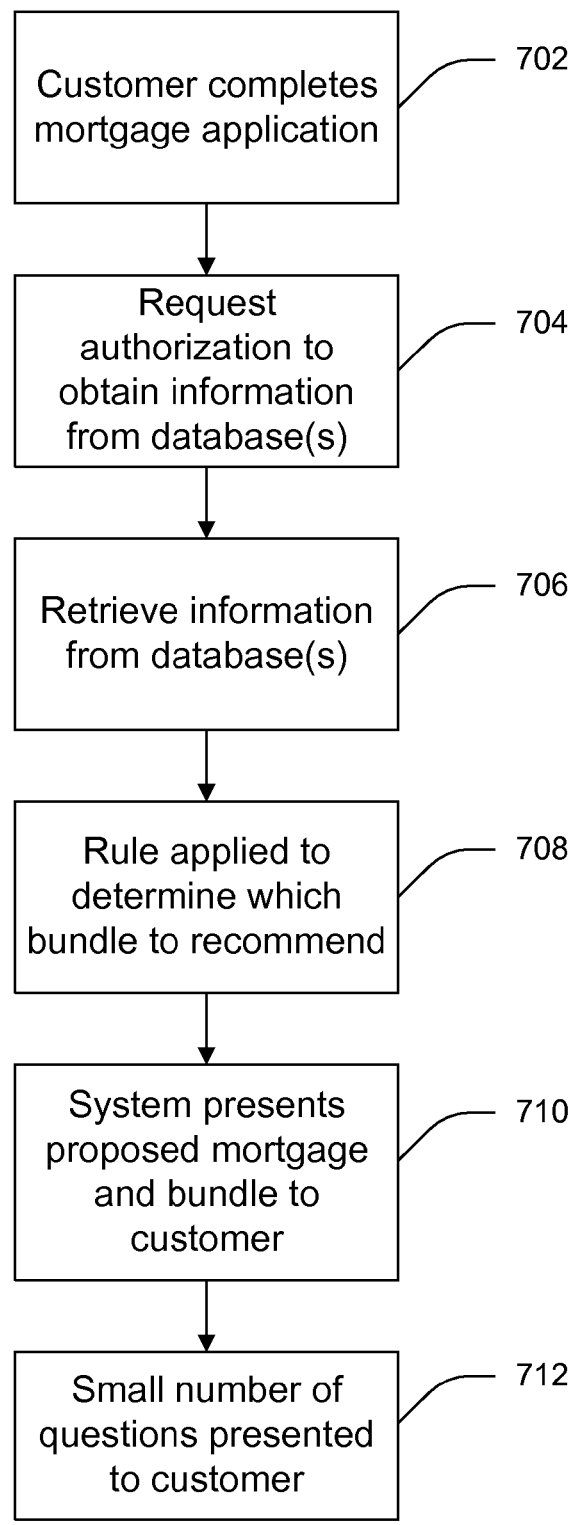
FIG. 7 is a flow diagram of an example process of taking a mortgage application and offering a package of financial products.

FIG. 7 shows an example process flow, in which a customer applies for a mortgage and is presented with an option to purchase a mortgage as part of a package of financial services. It is noted that the process of FIG. 7 is described, by way of example, with reference to the various user interfaces shown in the drawings. However, this process may be carried out in any system, and is not limited to the scenarios described herein. Moreover, the flow diagram shows examples in which stages of a process are carried out in a particular order, as indicated by the lines connecting the blocks, but the various stages shown in these diagrams can be performed in any order, or in any combination or sub-combination.

At 702, the customer completes a mortgage application with a financial services company. For example, the customer may complete the mortgage application on the financial services company's web site through a browser, using a user interface such as that shown in FIG. 3.

At 704, the customer is requested to allow access to his or her records in the financial services company's database. In many cases, these records are treated as private and are governed be regulations. Thus, the customer may be asked to grant permission to use the records.

At 706, the customer's records are retrieved from a database in which they are stored. These records may include, for example, credit scores or other credit information, medical information, motor vehicle information, insurance scores, or any other type of information. This information may be used in assessing the risk associated with the various products that the customer may be offered, setting a price for those products, determining which package of products to offer, etc.

At 708, a rule is applied to determine which bundle of financial products to recommend to the customer. For example, different combinations of products may be offered based on the customer's age, the amount of the mortgage he or she is applying for, the location of the property to be mortgaged, the risk associated with the customer as predicated by past behavior, or on any other factors.

At 710, a proposed mortgage, and a price thereon, is presented to the customer for approval. Additionally, a bundle of financial products (e.g., homeowner's insurance, mortgage protection, life insurance) is offered to the customer. For example, this offer may be made through the user interface shown in FIG. 4.

If the customer chooses to pursue the bundle of financial products, the customer may be presented (at 712) with a small number of questions, such as those shown in FIG. 5.

The subject matter described herein may be implemented through the use of a computer system, or other type of device that has some computing mechanism(s). FIG. 11 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

Figure 8:
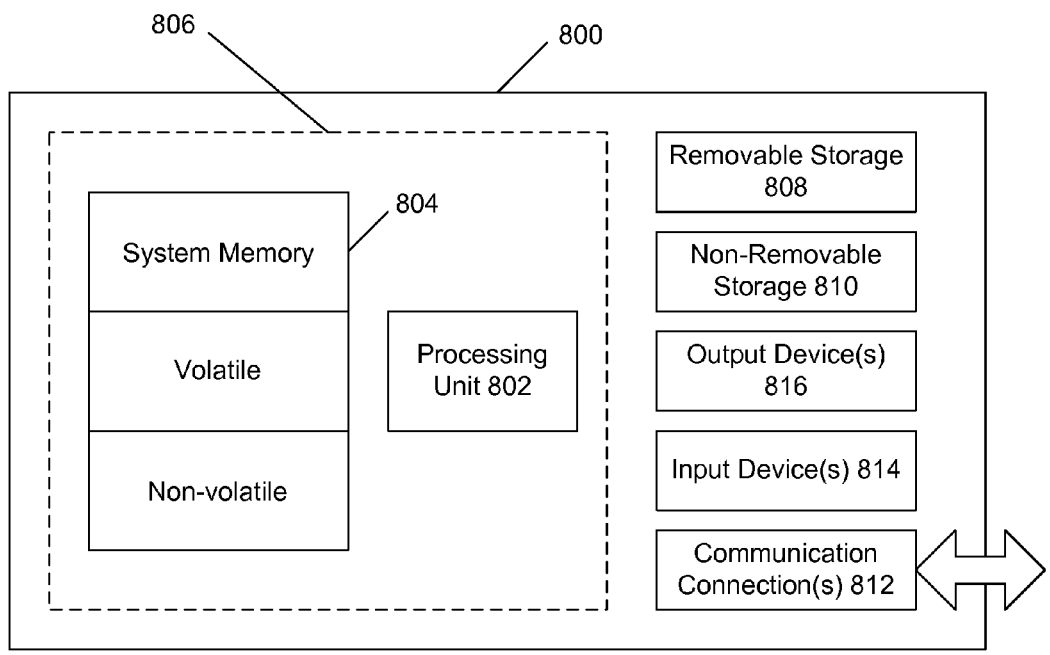
FIG. 8 is a block diagram of an example computing environment in which example embodiments and aspects may be implemented.

With reference to FIG. 8, an example system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by computing device 800 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 804, removable storage 808, and non-removable storage 810 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 800. Any such computer storage media may be part of computing device 800.

Computing device 800 may also contain communications connection(s) 812 that allow the device to communicate with other devices. Communications connection(s) 812 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 800 may also have input device(s) 814 such as keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described previously. Rather, the specific features and acts described previously are disclosed as example forms of implementing the claims.

The invention claimed is:

1. A system for providing a financial product, the system comprising:
   a database;

a processor coupled to the database; and a computer readable medium coupled to the processor and storing a plurality of instructions, which, when executed, cause the processor to provide the financial product, the plurality of instructions comprising:

instructions that cause the processor to receive, at a web server of a financial services company, a mortgage application from a customer of the financial services company, wherein the mortgage application includes first information;

instructions that cause the processor to retrieve, from the database, second information concerning the customer comprising an amount of an original life insurance policy on the customer;

instructions that cause the processor to select from among a plurality of additional financial products of the financial services company, based on the first information and the second information, one or more of the plurality of additional financial products to include in a package, wherein a first one of the additional financial products comprises a life insurance policy;

instructions that cause the processor to determine an increase in an amount of the life insurance policy in comparison with the original life insurance policy; and instructions that cause the processor to communicate to the customer an offer to provide the package and a price for the package including the increase in the amount of the life insurance policy.

2. The system of claim 1, wherein a first one of the financial products comprises a life insurance policy, and wherein the plurality of instructions further comprise instructions that cause the processor to receive one or more answers from the customer to one or more questions concerning a risk associated with providing the life insurance policy.

3. The system of claim 2, wherein one of the one or more questions relates to the customer's status of tobacco usage.

4. The system of claim 2, wherein one of the one or more questions relates to the customer's medical history of visiting a doctor for an illness.

5. The system of claim 2, wherein the plurality of instructions further comprise instructions that cause the processor to base selection of the financial products or the price upon the one or more answers.

6. The system of claim 1, wherein the plurality of instructions further comprise instructions that cause the processor to retrieve from the database, a history of the customer's behavior with respect to the financial services company, wherein selection of the financial products or the price is based at least in part on the history.

7. The system of claim 1, wherein the second information comprises a credit score.

8. The system of claim 1, wherein the plurality of instructions further comprise instructions that offer the customer an opportunity to make a unified periodic payment for the package.

9. A method of providing a financial product, the method comprising:

providing a computing device having a processor, a database accessible to the processor, and a memory;

programming the processor to receive, at a web server of a financial services company, a mortgage application from a customer of the financial services company, wherein the mortgage application includes first information;

programming the processor to retrieve, from the database, second information concerning the customer, wherein the second information comprises an amount of an original life insurance policy on the customer;

programming the processor to select from among a plurality of additional financial products of the financial services company, based on the first information and the second information, one or more of the plurality of additional financial products to include in a package, wherein a first one of the additional financial products comprises a life insurance policy;

programming the processor to determine an increase in an amount of the life insurance policy in comparison with the original life insurance policy; and programming the processor to communicate to the customer an offer to provide the package and a price for the package including the increase in the amount of the life insurance policy.

10. The method of claim 9, wherein a first one of the financial products comprises a life insurance policy, and wherein the method further comprises programming the processor to receive one or more answers from the customer to one or more questions concerning a risk associated with providing the life insurance policy.

11. The method of claim 10, wherein one of the one or more questions relates to the customer's status of tobacco usage.

12. The method of claim 10, wherein one of the one or more questions relates to the customer's medical history of visiting a doctor for an illness.

13. The method of claim 10, further comprising programming the processor to base selection of the financial products or the price upon answers to the one or more answers.

14. The method of claim 9, wherein the mortgage application is received by a financial services company, and wherein the method further comprises programming the processor to retrieve, from the database, a history of the customer's behavior with respect to the financial services company, wherein selection of the financial products or the price is based at least in part on the history.

15. The method of claim 9, wherein the second information comprises a credit score.

16. The method of claim 9, further comprising programming the processor to offer the customer an opportunity to make a unified periodic payment for the package.

17. A non-transitory computer-readable medium comprising computer-readable instructions to provide a financial product, the computer-readable instructions comprising instructions that:

receive, at a web server of a financial services company, a mortgage application from a customer of the financial services company, wherein the mortgage application includes first information;

retrieve, from the database, second information concerning the customer comprising an amount of an original life insurance policy on the customer;

select from among a plurality of additional financial products of the financial services company, based on the first information and the second information, one or more of the plurality of additional financial products to include in a package, wherein a first one of the additional financial products comprises a life insurance policy;

instructions that cause the processor to determine an increase in an amount of the life insurance policy in comparison with the original life insurance policy; and communicate to the customer an offer to provide the package and a price for the package including the increase in the amount of the life insurance policy.

18. The non-transitory computer-readable medium of claim 17, wherein a first one of the financial products comprises a life insurance policy, and wherein the computer-readable instructions further comprise instructions that receive one or more answers from the customer to one or more questions concerning a risk associated with providing the life insurance policy.

19. The non-transitory computer-readable medium of claim 18, wherein one of the one or more questions relates to the customer's status of tobacco usage.

20. The non-transitory computer-readable medium of claim 18, wherein one of the one or more questions relates to the customer's medical history of visiting a doctor for an illness.

21. The non-transitory computer-readable medium of claim 18, wherein the computer-readable instructions further comprise instructions that base selection of the financial products or the price upon answers to the one or more answers.

22. The non-transitory computer-readable medium of claim 17, wherein the computer-readable instructions further comprise instructions that retrieve, from the database, a history of the customer's behavior with respect to the financial services company, wherein selection of the financial products or the price is based at least in part on the history.

23. The non-transitory computer-readable medium of claim 17, wherein the second information comprises a credit score.

24. The non-transitory computer-readable medium of claim 17, wherein the computer-readable instructions further comprise instructions that offer the customer an opportunity to make a unified periodic payment for the package.

\* \* \* \* \*